Jan. 8, 1946. W. T. STEPHENS 2,392,422
HYDRAULIC CONTROL VALVE
Filed Nov. 9, 1942
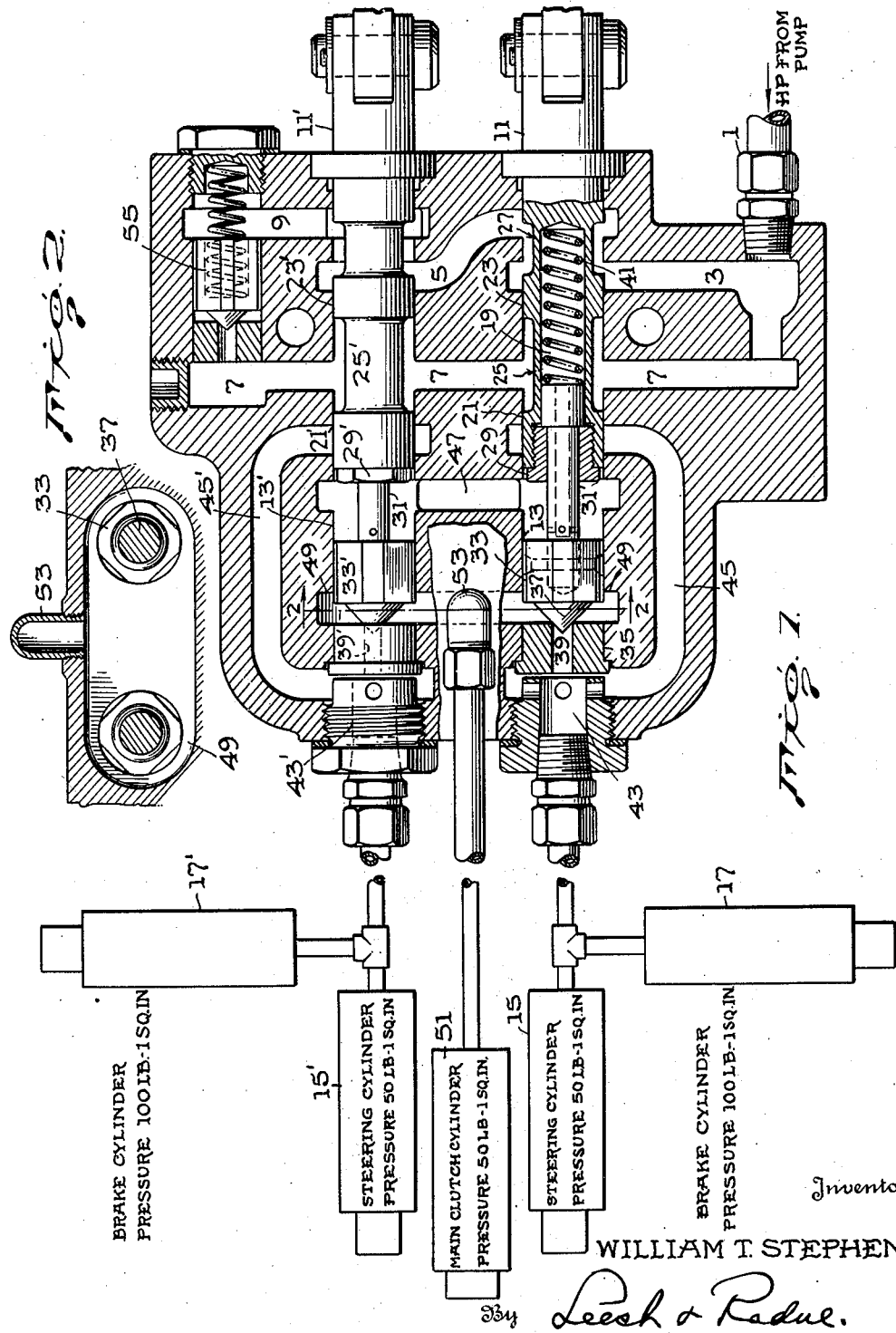

Patented Jan. 8, 1946

2,392,422

UNITED STATES PATENT OFFICE 2,392,422

HYDRAULIC CONTROL VALVE

William T. Stephens, Cleveland, Ohio, assignor to Hydraulic Control Engineering Company, Cleveland, Ohio, a corporation of Ohio Application November 9, 1942, Serial No. 465,059

9 Claims. (Cl. 277—60)

The present invention relates to a hydraulic system and control apparatus therefor and, more particularly, to a hydraulic control for tensioning steering bands, applying braking bands, clutching and declutching prime movers from drive shafts, and arresting movement of planetary transmissions of tractor vehicles, especially tracklaying tractors. The invention contemplates a novel and simply constructed hydraulic valve mechanism for minutely controlling these operations with positiveness and without substantial physical effort on the part of the operator.

Track-laying vehicles are of two general types, one type using disk clutches for controlling the application of driving power to the drive sprockets, and a second type using a planetary transmission. The first type usually uses some form of conventional brake on the drive shafts for arresting movement thereof while the second type does not require an individual braking system due to the inherent constitution of the planetary transmission. Both types of drive utilize a main clutch for coupling and uncoupling the track driving mechanism to the tractor power plant. The steering, braking and declutching of the driving mechanisms of both types have heretofore been operated by manually positioned levers.

Steering for the first type of tractor drive wherein disk clutches are utilized is accomplished by disengaging the driver or sprocket clutch on the side toward which the vehicle is to be turned and simultaneously continuing the application of power on the opposite side. Thus, the vehicle pivots about the undriven or dead track. In braking, the driver clutches are first disengaged to protect the clutches from the destructive action which would result from the retarding action of the brakes while the clutches are still transmitting power from the engine.

In steering and braking the second type of tractor using a planetary transmission for driving the chain sprockets, a brake is applied to one side driver to retard or stop its motion while allowing motion on the opposite driver, generally at an increased speed. Thus, the steering is quite similar to the first type. When it is desired to stop the vehicle, both side drive shafts are braked.

In practicing this invention the individual braking bands, steering bands, planetary transmissions, and clutch disengagers of track-carrying tractors are actuated by conventional hydraulic cylinders, pistons or jacks receiving fluid from a closed hydraulic pressure system and do not form a part of this invention per se. The operation of these devices and their sequence of application is by means of a hydraulic valve and valve arrangement and forms the salient feature of this invention. The broad concept of the invention and the generic principles of the valve per se are disclosed and claimed in my copending application, Serial No. 455,955, filed August 24, 1942, of which this application is a continuation in part.

In the drawing:

Figure 1 is a diagrammatic layout of the hydraulic cylinders for operating the brakes, steering bands and declutching cylinder of both types of track-laying tractors with the hydraulic control valve therefor shown in cross section; and Figure 2 is a fragmentary vertical section through the valve plungers and portion of the valve casing taken on line 2—2 in the direction of the arrows.

These several operations of steering the tractor either to the right or left, the application of the brakes to stop the tractor, and the removal of power to the drive axles at substantially the moment the brakes are applied, may be readily controlled by the use of a valve and hydraulic system means having the novel features of this invention.

To enable those skilled in the art to understand the broad aspects of operation of this invention the following is a general description thereof.

With the present control valve in neutral or non-operative position, as shown in the drawing, oil from a suitable pump in the closed hydraulic system enters the valve casing through inlet 1 and flows freely in passages 3—5—7 and 9, this latter passage leading back to the oil storage tank or reservoir of the system.

Two identical valve plungers 11, 11' are mounted in spaced parallel horizontal bores 13, 13', extending through the casing, and control the hydraulic fluid passing through the valve and leading to exterior piping connected to steering cylinders 15, 15', braking cylinders 17, 17', and clutch cylinder 51. It will be understood that these hydraulically operated devices, diagrammatically shown, are provided with suitable pistons and linkages for connection to and operation of the friction bands and brakes of the tractor steering and braking mechanisms and the clutch of the tractor engine. These conventional mechanisms per se form no part of the present invention.

The cylindrical reciprocal valve plungers 11 and 11' are identical in construction and each plunger has an axial interior bore 19, and exterior spaced lands 21 and 23 with adjacent reduced diameter groove portions 25 and 27. The enlarged inner ends or lands 21 of the valve plungers carry threaded bushings 29 through which extend the stems 31 of the secondary relief valves 33 which normally engage apertured valve seats 35. The body portions of these secondary relief valves are substantially square in cross section, as disclosed in Fig. 2, to permit the flow of fluid therearound when the conical heads 37 of the relief valves are raised from engagement with the passages 39 of the valve seats. These passages are normally closed by the heads 37 under the influence of springs 41 positioned in the longitudinal bores 19 of the valve plungers and pressing on the ends of the relief valve stems 31.

The operation of either pair of steering and braking cylinders 15, 17 and 15', 17', is identical and, thus, to project the actuating piston in steering cylinder 15, the valve plunger 11 is moved partially inward to a position where the high pressure fluid in the system will flow through inlet 1 and passage 3 to passage 7 and thence to passage 45, around groove 25 and, at the same time, close off communication between passage 3 and passage 5 by the enlarged end of the outer stem portion of the plunger. The position of groove 25, following this initial movement of the plunger to where it bridges passages 7 and 45, allows oil under pressure to flow through port 43 of the outlet plug and through the connecting conduit to cylinder 15 to thereby move the piston therein to operate and apply this steering band of the tractor. The pressure fluid also flows to braking cylinder 17, but, inasmuch as the braking cylinder is set so as to not operate under 100 pounds per square inch, and the steering cylinder is set to operate at 50 pounds per square inch, only the steering cylinder and piston function at this pressure.

The partial inward movement of the plunger 11 and compression of the spring of the associated relief valve 33 places a pressure of slightly above 50 pounds per square inch on head 37 and, consequently, as soon as the steering cylinder 15 set for this pressure has functioned, the back pressure will raise head 37 from its seat and allow the fluid to bypass through opening 39, passage 49, around the square head of the relief valve to passage 47 coupled to a return line leading to the reservoir of the system. The spring loading and compression thereof is such that the plunger 11 will not move sufficiently for the land 21 to close off communication between passage 49 and passage 47 when a pressure of 50 pounds per square inch is maintained at port 43. However, when the piston in steering cylinder 15 reaches the limit of its stroke, the internal resistance therein rises above 50 pounds per square inch and the relief valve opens as before described.

When the plunger 11 is retracted after operation of the steering cylinder to its original position, the spring loading on the relief valve 33 is relieved and fluid from the cylinder 15 freely returns to the storage reservoir by lifting the valve 33 from its seat and flowing around the seat to passage 47 connected to the fluid storage tank. The second valve plunger 11' is similarly operated to energize the opposite steering cylinder 15', the partial movement of the plunger 11' controlling the right-hand steering cylinder.

When it is desired to stop or positively apply both brakes and disengage the power clutch of the prime mover it is accomplished by forcing both valve plungers 11 and 11' to their innermost positions and, thus, fluid pressure will pass through passage 3 to passages 7, 45 and 45', and through outlet ports 43 to both steering cylinders 15 and 15', and braking cylinders 17 and 17'. The steering cylinders operate and the oil pressure therein builds up to approximately 100 pounds per square inch to raise relief valves 33 and bypass oil to passage 49. Oil then passes to the clutch operating cylinder 51 through passage 49 and port 53 leading to the clutch cylinder.

This declutching action is accomplished by blocking the flow of oil by land 21 between passages 49 and 47 due to the forcing of the valve plungers 11 and 11' to the limit of their inward stroke and the placing of a spring loading on the relief valves 33 of above 50 pounds per square inch and less than 100 pounds per square inch. Inasmuch as the flow of fluid to passage 47 is blocked by the lands 21 of plungers 11 and 11' the oil is forced to circulate through passage 49 and, thence, to port 53 and clutch cylinder 51. The piston in clutch cylinder 51 is set to operate at approximately 50 pounds per square inch and, consequently, when the limit of its stroke is reached, the clutch will be disengaged and the internal resistance therein will build up to 100 pounds per square inch and, thus, operate the brake cylinders 17 and 17' that are set for this increased pressure.

Based on this general description of the operation of the present improved hydraulic control valve, it will be appreciated that the valve may be used in several specific combinations. For instance, when it is desired to control a tractor of the first type wherein disk clutches are used for applying power to the driving sprockets, the present control is capable of operating the hydraulic cylinders for steering, braking, and declutching the power shaft. A modification of the control of this first type is involved where only steering and braking control is provided. In the second type of track-laying tractor control where a planetary transmission is used for driving the chain sprockets, the present system may provide a means of steering, braking, and master clutch control, or a modification of this second type where only steering and braking control is provided. These two main control systems and their modifications will now be described in some detail.

To carry out the control of a tractor using disk clutches where steering, braking, and declutching is desired, the hydraulic valve is operated to energize steering cylinder 15 by depressing plunger 11 in a sufficient amount to produce a valve setting of secondary relief valve 33 of slightly over 50 pounds per square inch. When this is done, the land to the right of recess 27 of plunger 11 closes off bore 13 between passages 3 and 5 and, at the same time, the groove 25 of the plunger bridges passages 7 and 45 to allow oil from passage 7 to be communicated therethrough via passage 3 and high pressure inlet port 1. The oil flows to passage 45 via bore 13 around groove 25 and thence to cylinders 15 and 17 through outlet port 43. After the piston in cylinder 15 has reached the end of its stroke and the pressure therein builds up to a point exceeding the spring setting of valve 33 in bore 13, the valve head 37 is cracked or lifted and the oil by-passes back to the storage tank by one of two routes. Thus, oil may pass through passage 39 in valve seat 35 through passage 49, through bore 13', around valve head 37', and through passage 47, or the oil may pass through passage 39 in valve seat 35 through bore 13, around valve head 37, and through passage 47. When the plunger 11 is retracted and is returned to the neutral position by means of spring 41, the pressure setting of relief valve 33 is simultaneously released and permits a return flow of oil from cylinder 15 and thence through port 43 and passage 39 where it lifts valve head 37 and returns to the tank, as previously described. The steering cylinder 15' is operated in a similar manner by plunger 11'.

In the event that either plunger 11 or 11' is not moved inwardly sufficiently to produce a 50 pound pressure or other desired pressure setting to operate either cylinder 15 or 15', the relief valves 33 and 33' will open at the lower setting and allow the oil to pass back to the tank without producing movement of the piston in the steering cylinder.

To operate the brake cylinder 17, it is necessary that the plunger 11 be pressed in sufficiently to produce a relief valve setting in excess of 100 pounds per square inch on the valve 33. When this is done, oil will then flow to both cylinders 15 and 17 and, since cylinder 15 is set to operate at a lower pressure than cylinder 17, cylinder 15 will function ahead of cylinder 17 and disengage the driver clutch before sufficient pressure is built up to operate brake cylinder 17. This sequence of operation assures the release of the driver clutch prior to the application of the brake. After brake cylinder 17 has functioned and the piston therein has reached the end of its stroke, fluid pressure is built up exceeding the setting of the relief valve 33 and, consequently, the valve head 37 is lifted from its seat and the oil will pass back to the tank, as previously described. However, if the plunger 11 has been pushed in a sufficient amount, so that land 21 has closed bore 13 between passages 49 and 47, the oil can return to the tank only through passages 39, 49, 13' and through 47.

In a similar manner, brake cylinder 17' is caused to operate by pressing in plunger 11', and the operation of either brake cylinder 17 or 17', as described, makes possible the turning of the tractor on a small radius, as the application of the brake locks the sprocket driver and prevents any coasting as would be the case if the driver were merely disconnected by means of the driver clutch controlled by cylinders 15 or 15'.

When it is desired to completely arrest movement of the tractor and also to disengage the main clutch controlled by cylinder 51, both plungers 11 and 11' are pressed inwardly simultaneously and to the extent of their travel. This action causes the lands 21 and 21' to close off bores 13 and 13' between passages 49 and 47 and the oil thereupon flows to and acts on cylinders 15, 15', 17 and 17'. When the cylinders 15 and 15' have reached the ends of their strokes and sufficient pressure is built up to lift the valve heads 37 and 37' of valves 33 and 33', the oil is forced to flow to passage 49 through passages 39 and 39' in valve seats 35 and 35'. Since both bores 13 and 13' are closed off between passages 49 and 47, oil flows from passage 49 to cylinder 51 via port 53. Consequently, when cylinder 51 has operated and the oil pressure is again built up, it reacts on cylinders 17, 17' and when these open fully the oil acts against relief valve 55 lifting it from its seat and allowing the oil to flow back through passage 9 to the storage tank. The setting of relief valve 55 is such that it always exceeds the maximum setting of the secondary relief valves 33 and 33' and thus assures the proper sequence of operations depending upon the setting of the secondary relief valves before the main relief valve is put into operation.

When the valve is used for the modified control of vehicles of the first general type and only steering and braking control is provided, the system operates substantially as before described, with the exception that port 53 is plugged off and cylinder 51 removed or not used. Thus the sequence of operations ceases after the brakes have been applied and the resulting build up of pressure reacts on valves 33 and 33'. When these valves are open, the oil can only pass into passage 49 and as this has been blocked by the plug in port 53, the reaction pressure is carried back to the main relief valve 55 and the oil is by-passed via passage 9 to the storage tank. This type of control is used where some form of manual operator is provided for disengaging the main clutch.

Referring now to the second general form of drive wherein a planetary transmission is used, the cylinders 15 and 15' are used to apply the brakes on the planetary system and the cylinder 51 is used to operate the main clutch. The operation of cylinders 15 and 15' is identical to that previously described for operating the driver clutch in the first general type of tractor. When it is desired to stop the tractor and disengage the main clutch, both plungers 11 and 11' are positioned all the way in and this produces an identical condition to the first form of control with the plungers all the way in. The passage of oil is the same as previously described for this condition except that the cylinders 17 and 17' are eliminated.

With the modified control of a planetary transmission system, the operation is identical to that of the modified control of the first type of tractor, except, of course, the cylinders 17 and 17' have been eliminated and an independent clutch control is necessary for disengaging the main clutch.

Thus, the four customary ways of operating a track-laying vehicle have been described in detail and it is apparent that, while the use of the present hydraulic control valve and system embraces these four systems, it is in no way limited thereto.

The hydraulic operation of the steering cylinders and disengagement of the engine clutch prevents any tendency of the tractor to spin around when the brakes are applied and positively prevents the application of the brakes when the clutch is engaged and torque is still on the drive sprockets and, thus, the brakes will only be called upon to arrest movement of the tractor.

As a further safety feature for the entire hydraulic system, a spring tensioned main relief valve 55 positioned between passages 7 and 9 is provided, whereby, if a back pressure in excess of 100 pounds per square inch builds up in passage 7 from passage 47 and grooves 25, the relief valve 55 will crack and bleed fluid through passage 9 to the storage tank. Since such an excessive pressure will only be present after the brake cylinders set for 100 pounds per square inch have functioned, the system will have accomplished its useful work before this excessive pressure is built up and the relief valve 55 is unseated.

Other forms of hydraulically operated units using a plurality of cylinders operating in a definite sequence and utilizing different operating pressures, or where it is desired to serially operate a plurality of hydraulic devices some of which operate at lower pressure than others, are broadly included within the scope of this invention.

What I claim is:

1. In a hydraulic control valve of the type described, in combination, a casing having an inlet for oil under high pressure, a pair of power ports, a pair of similar bores, a passage connecting said inlet to both bores, separate ducts connecting each power port to one of said bores, a reciprocable plunger in each of said bores and each having a land normally isolating the associated duct from its bore, a groove in each of said plungers movable therewith to connect the duct to said passage whereby oil under pressure may flow to a power port, a ported valve seat for and open to each duct, a chamber connecting the seat ports, a relief valve biased to close each seat port from the chamber, each relief valve being housed in a compartment extending between said chamber and a discharge passage for oil under low pressure, and means controlled by the valve plungers to isolate said chamber from said discharge passage whereby pressure is built up in the chamber when a relief valve is forced open by pressure, and an auxiliary power port from said chamber.

2. In a hydraulic control valve of the type described, in combination, a casing having an inlet for oil under high pressure, a pair of power ports, a pair of similar bores, a passage connecting said inlet to both bores, separate ducts connecting each power port to one of said bores, a reciprocable plunger in each of said bores and each having a land normally isolating the associated duct from its bore, a groove in each of said plungers movable therewith to connect the duct to said passage whereby oil under pressure may flow to a power port, a ported valve seat for and open to each duct, a chamber connecting the seat ports, a relief valve biased to close each port from the chamber, each relief valve being housed in an end of each of said bores extending between said chamber and a discharge passage for oil under low pressure, said lands being movable into said ends to isolate them from the discharge passage whereby pressure is built up in the said chamber when one or both relief valves are forced open by pressure in said ducts, and an auxiliary power port from said chamber.

3. The valve as set forth in claim 2 in which the lands may move to provide communication between the high pressure passage and the power port ducts while the bore ends are associated with the discharge passage.

4. The valve as set forth in claim 2 in which the biasing for the relief valves is effected by a spring interposed between each relief valve and its corresponding plunger whereby the pressure closing the relief valve increases as the plunger is moved to open communication between the high pressure passage and a duct.

5. A hydraulic valve for controlling the flow of liquid under pressure to a plurality of related liquid actuated motor devices including a casing having a pair of valve plungers therein, each of said plungers being adapted for controlling the flow of liquid under pressure to a motor port, a working relief valve for and always exposed to the pressure of the related motor port and associated with each of said valve plungers, means dependent on the positions of the plungers for automatically setting said relief valves for different working relief pressures for selectively controlling the pressure at each motor port, a passage adapted to be connected to the liquid under pressure by opening of the relief valves, a third motor port connected to said passage, means connecting said passage to waste, means actuated by setting of both of said valve plungers for delivery of liquid under pressure to both first mentioned motor ports and for closing the connection to waste whereby liquid under pressure is delivered to the third motor port.

6. A fluid control valve adapted to operate a plurality of fluid responsive devices, comprising a valve casing having a pair of spaced bores therethrough, reciprocable valve plungers in said bores, power ports in the said casing the flow of fluid to which is controlled by the position of said valve plungers, apertured relief valve seats communicating with said power ports, fluid passages in said casing controlled by movement of said valve plungers, an inlet for fluid under pressure connected to said fluid passages, adjustable relief valves mounted in said bores adjacent the ends of said plungers and controlling the passage of fluid through said apertured valve seats, said seats leading to a common fluid discharge passage in front of said relief valves and having a third power port, a second common passage arranged behind the relief valves and adapted for connection to waste, the relief valves affording space for liquid flow between said discharge and waste passages, and means to project the plungers into the bores between said discharge and waste passages whereby they are separated.

7. A hydraulic control valve adapted to govern a plurality of hydraulically operated devices, comprising a casing having an inlet for liquid under pressure and a plurality of power ports, a pair of spaced parallel bores extending through said casing, reciprocable plungers in said bores, spring projected valve heads mounted beyond the ends of said plungers and positioned each to close an aperture in a valve seat in the end of one of said bores, each said aperture being in communication with one of said power ports, a plurality of transverse fluid passages joining said bores, one being connected to said inlet and one being connected to waste, lands on each reciprocable plunger for selectively controlling the flow of liquid under pressure to and from its power port, said lands being jointly in control of the said transverse passage connected to waste to isolate the bores and ports therefrom, said heads being in control of another of said transverse passages and a third power port connected to the last mentioned passage.

8. A valve comprising a casing having an inlet and an outlet, bores through said casing, each bore having a valve plunger reciprocable therein, a forwardly projecting head on each plunger having an area less than the bore, a fluid passage communicating with each bore, controlled by the plunger therein and leading to a motor port in said casing, an apertured valve seat in the forward end of each bore and in open communication with the corresponding motor port, transverse fluid passages joining said bores on the plunger sides of said heads and one connected to said outlet and one to said inlet, means for applying the heads of said valve plungers against said seats at a varying pressure, means to close one of the transverse passages by said plungers to prevent flow thereto past said heads and a transverse passage connecting said bores on the seat side of said head and having a separate motor port.

9. A valve as set forth in claim 7 wherein the reciprocable valve plungers are hollow for the reception of springs, and the valve heads closing the apertured valve seats are progressively pressed into tighter engagement therewith by movement of said valve plungers.

WILLIAM T. STEPHENS.